May 6, 1947.                M. H. SWEET                2,420,058
              COMPENSATED PHOTOELECTRIC PHOTOMETER CIRCUITS
                         Filed Jan. 18, 1945
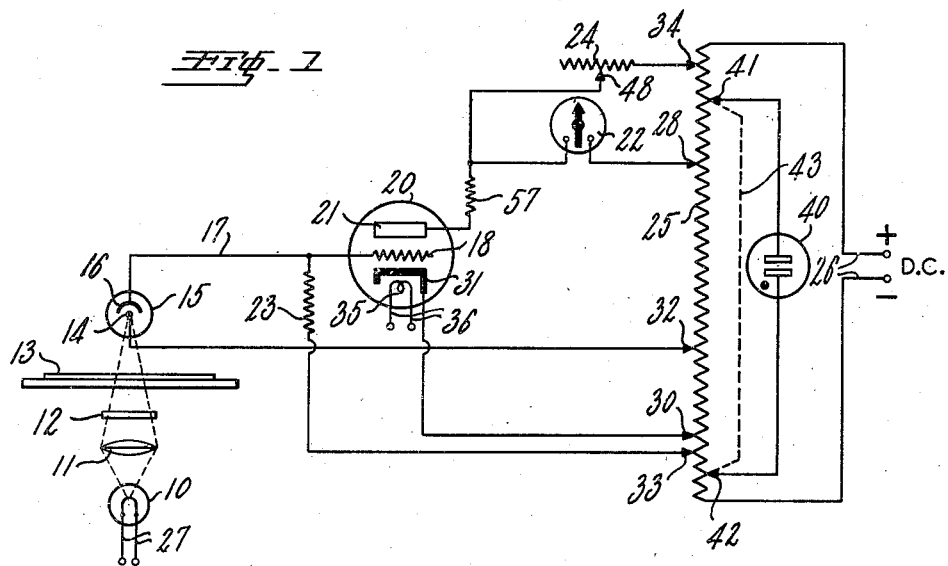
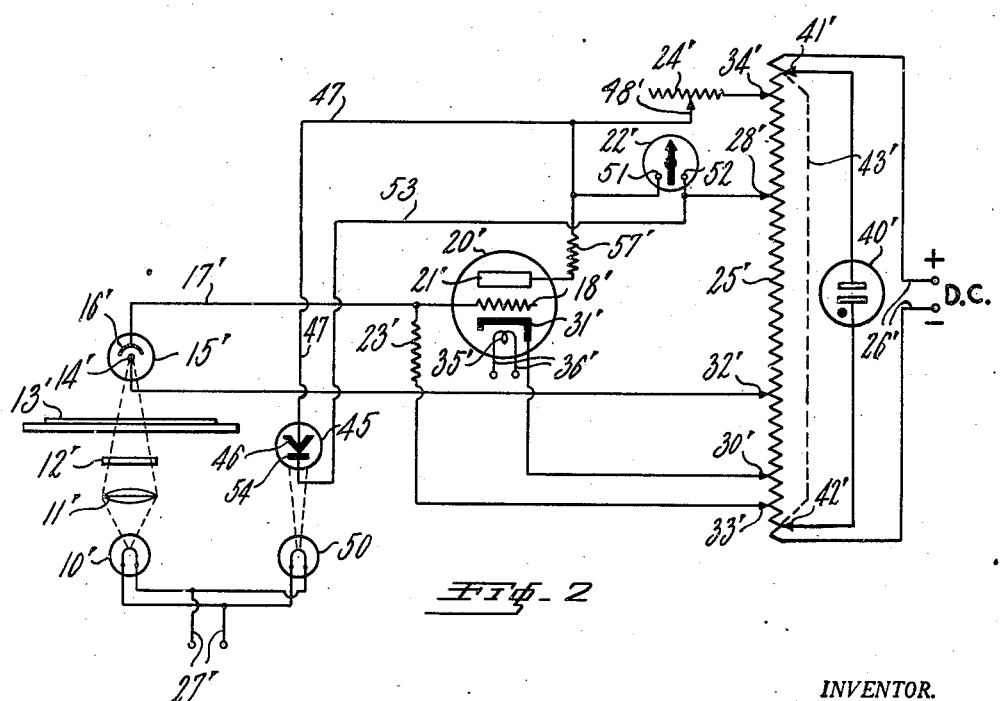
INVENTOR.
MONROE H. SWEET
ATTORNEY Patented May 6, 1947

2,420,058

UNITED STATES PATENT OFFICE 2,420,058

COMPENSATED PHOTOELECTRIC PHOTOMETER CIRCUITS

Monroe Hamilton Sweet, Binghamton, N. Y., assignor to General Aniline & Film Corporation, New York, N. Y., a corporation of Delaware Application January 18, 1945, Serial No. 573,405

19 Claims. (Cl. 250—41.5)

This invention relates to compensated condition measuring circuits and more particularly to a voltage regulated logarithmic responsive photometer circuit.

In electrical condition measuring apparatus, such as photometer circuits employing a source of light and a photosensitive receiver, it is important in ordinary circuits that the voltage be maintained accurately at a predetermined value in order to stabilize the resultant indications. Hitherto, this has generally been accomplished by stabilizing the supply voltage to the light source, either manually or automatically. However, neither the manual nor the automatic method is completely satisfactory. The manual method requires constant attention on the part of the operator and thus distracts his attention from observing the readings of the indicating instrument. The automatic method hitherto used is bulky and expensive, usually requiring a voltage stabilizer of the magnetic type.

It is among the objects of this invention to provide an internally stabilized condition measuring electronic circuit; to provide a logarithmic responsive condition measuring circuit including means for stabilizing the output indications irrespective of fluctuations in the supply voltage; to provide a light transmission measuring circuit in which the indications are logarithmically related to the light incident upon a photosensitive receiver and including means for stabilizing the output indications irrespective of fluctuations in the supply voltage; and to provide simple inexpensive means for automatically stabilizing logarithmic photometer and densitometer circuits irrespective of changes in the supply voltage.

These and other objects, advantages and novel features of the invention will be apparent from the following description and the accompanying drawing. In the drawing:

Figure 1 is a schematic electrical diagram of one embodiment of the invention.

Figure 2 is a schematic electrical diagram of another embodiment of the invention.

In accordance with the principles of the present invention, a circuit element is incorporated in logarithmic responsive radiant energy measuring systems, which element is operatively responsive to the intensity of the radiant energy source to introduce, into the output of the measuring circuit, an amount of energy of such polarity and magnitude as to compensate for fluctuations in the output resulting from variations in the intensity of the radiant energy source. Desirably, a compensating network including a voltage divider and electronic voltage stabilizing means also is incorporated in the circuit. In a modification of the invention, an additional photosensitive element is used as part of the compensating means in the circuit.

The principles of the present invention are applicable to all types of logarithmically responsive radiant energy measuring circuits. Typical logarithmically responsive circuits are described and claimed in my copending applications Serial No. 452,697, filed July 29, 1942, for "Direct reading densitometer," and Serial No. 570,627, filed December 30, 1944, for "Logarithmic photometers." While of general applicability to all logarithmically responsive measuring circuits, for purposes of illustration the invention will be more particularly described as applied to the direct reading densitometer circuit described and claimed in my said application Serial No. 452,697. It should be understood, however, that this description is exemplary only and that the invention is not confined to this particular circuit.

In photometric systems hitherto used, wherein the meter deflection is directly proportional to the light flux incident upon a photocell, compensation for changes in light source intensity (due to changes in line voltage) is difficult to accomplish because any compensating current must vary in magnitude according to the portion of the scale deflection corresponding to each particular scale reading. For instance, a variation in light source intensity of five per cent would require a compensated current in the meter circuit of five per cent of the full scale current for readings in the neighborhood of full scale. For readings in the neighborhood of half scale, a compensated current of two and one-half per cent of the full scale current would be required. Similarly, no compensating current would be required on zero scale deflection.

In logarithmic responsive photometer circuits of the type described and claimed in my said copending applications, the magnitude of the compensating current required in the output circuit remains the same irrespective of the scale reading. That is, a given percentage variation in the light source intensity requires the same value of compensating current irrespective of the reading of the meter scale. This circumstance is unique to logarithmic responsive photoelectric photometer circuits. Therefore, any means which provides the proper polarity and magnitude of compensating current therein will achieve stability in the meter indications irrespective of changes in the intensity of the light source or of the particular portion of the scale used.

Referring to Figure 1, a logarithmic responsive photoelectric circuit of the type described and claimed in my copending application Serial No. 452,697 is illustrated, with voltage stabilizing means incorporated therein. As shown, a light source 10 is arranged in operative relation to a photo-emissive vacuum tube 15. Light from source 10 is directed by lens 11 through a filter 12 and a sample 13 upon the photo-emissive cathode 14 of tube 15. Sample 13 might, for instance, be a photographic film whose density is to be measured. The anode 16 of tube 15 is connected by a conductor 17 directly to the grid 18 of an amplifier tube 20. The parameters of tube 20 are so selected that the grid potential is a logarithmic function of the grid current, and thus of the phototube output current. As the output current from plate 21 of tube 20 is directly proportional to the grid voltage of the tube, the output current will thus be a logarithmic function of the phototube current. The phototube output current is in turn directly proportional to the light flux incident upon cathode 14. Accordingly, the indications of meter 22, which is connected in the output circuit of amplifier 20, are logarithmically related to the light flux incident upon phototube 15 and thus to the light transmission of sample 13.

As described in my said copending application Serial No. 452,697, a bucking current is introduced into the grid circuit of amplifier 20 by a resistor 23, to improve the linearity of response of meter 22. The aforementioned compensating element comprises an adjustable resistance 24 connected between one terminal of meter 22 and contact 34 of potentiometer 25. As will be described more fully hereinafter, the current through the resistance 24 is operatively responsive in linear relationship to the light intensity of source 10 to introduce, into the output circuit of amplifier 20, a bucking current of such polarity and magnitude as to compensate for fluctuations in the output of phototube 15 and amplifier 20 resulting from variations in the intensity of source 10. Resistance 24 performs the further function of restricting the useful portion of the characteristic curve of amplifier 20 to that wherein maximum linearity is obtained, thus further improving the linearity of response of meter 22.

The several voltages required for phototube 15 and amplifier 20 are derived from a potentiometer 25 connected across an unstabilized source of direct current 26. By suitable adjustment of the several taps along potentiometer 25, the proper voltages may be applied to phototube 15 and amplifier tube 20. The voltage applied to light source 10, which may be an incandescent lamp or any other light source, such as a gaseous discharge tube, is taken from the voltage supply by conductors 27 and is subject to fluctuations of the same magnitudes as or proportional to those mentioned above.

In the described circuit, the phototube supply voltage can vary over fairly wide limits without seriously affecting the performance of the photometer. However, there are five voltages that seriously affect the response of meter 22. These voltages are as follows:

1. The plate supply voltage to tube 20 which is derived, through meter 22 and plate load resistor 57, from taps 28 and 30. Tap 30 is connected to the cathode 31 of tube 20.

2. The grid bias voltage which is derived from tap 33.

3. The voltage for heating filament 35 of amplifier 20 which is derived through conductors 36, and is preferably connected to the line as are the conductors 27 of lamp 10.

4. The output circuit bucking voltage which is derived from tap 34.

5. The voltage for incandescent lamp 10 which is derived, through conductors 27, from the line.

The plate supply voltage, the phototube supply voltage and the grid biasing voltage may be satisfactorily stabilized by application of inexpensive gas filled stabilizer tubes, such as RCA type VR 150/30. For this purpose a gas filled stabilizer tube 40 is provided with a pair of taps 41 and 42 rigidly interconnected as indicated by dotted line 43, so that taps 41 and 42 are maintained a fixed ohmic distance apart, although, as a unit, they are adjustable along potentiometer 25. By so arranging taps 41 and 42 that tap 41 falls between taps 28 and 34 and tap 42 falls beyond tap 33, the voltages included between taps 28 and 33 are stabilized. Thus, the plate supply voltage and the grid biasing voltage are stabilized.

The voltage of the amplifier tube filament 35 may be effectively stabilized by means of a tungsten bridge circuit in the manner described in the November 1941 issue of "Electronics," published by McGraw Hill Publishing Company, or by any other convenient means. Alternatively, the voltage of filament 35 may be left unstabilized since by judicious selection of circuit constants the effect of a varying filament voltage may be made quite small.

The supply voltage of lamp 10 is not stabilized because it is difficult and uneconomical to stabilize low voltages at high currents by any simple convenient and economical means known to the art.

The output bucking voltage is developed between taps 28 and 34, and the degree of stabilization thereof is governed by the position of the adjustable taps 41 and 42. If the engagement of tap 41 with potentiometer 25 coincides with tap 34, the bucking current is completely stabilized within the limits of which the simple gaseous stabilizer circuit is capable. If tap 41 is adjusted to coincide with tap 28, the bucking current is entirely unregulated.

Assume that tap 41 is adjusted to engage potentiometer 25 at a point between taps 28 and 34. If the line voltage now drops, the intensity of lamp 10 will decrease and consequently the light flux incident on phototube 15 will also decrease. This will cause a consequent decrease of output current of amplifier 20. However, bucking current from adjustable resistance 24 will also decrease and thus tend to keep the residual current through meter 22 at a constant value. The magnitude of the change in the bucking current passing through the adjustable resistance 24 is controlled by the position of tap 41. By trial or calculation, a position for tap 41 may be found which will cause the bucking current to exactly compensate for fluctuations in the supply voltage to incandescent lamp 10 over a considerable voltage range.

The described arrangement is effective in logarithmic circuits only and not effective for linear responsive circuits or others known to the prior art. Assume that output meter 22 is a 1.0 milliampere meter, and the circuit constants are such that the output meter indications are a linear function of the flux incident on phototube 15. In such case, a line voltage drop of one per cent may give a drop of four per cent in the output meter reading. If the initial meter reading were full scale, the change in meter reading would thus be 0.04 milliampere as a consequence of the line voltage drop. With the above described voltage compensating means, it is possible to arrange the circuit constants so as to effect a decrease in the output bucking current of 0.04 milliampere for a line voltage drop of one per cent, and thus exactly compensate for line voltage variations in the region of full scale reading as described above. However, at one-tenth full scale, the correction introduced by adjustable resistance 24 would be ten times too large. In this case, a change in line voltage of one per cent would cause a change in meter current of 0.004 milliampere, one-tenth as great a change as at full scale. However, the bucking current from adjustable resistance 24 will again change by 0.04 milliampere, thus greatly overcompensating.

The reason for this will be apparent from a consideration of the relationships existing in linear photometer circuits. The equation for output current of a linear photometer circuit is as follows:

$$I = a \cdot T \cdot L$$

where

I is the output current
T is the transmission of the film
L is the intensity of the light source, and
$a$ is a constant From this equation, $$\frac{\partial I}{\partial L} = a \cdot T$$

where T is treated as a constant. The partial differential $\partial I$ thus equals $a \cdot T \cdot \partial L$. This means that a given incremental change in the intensity of the luminous flux incident upon tube 15 will cause a corresponding change in the output current I of amplifier 20, and the absolute value of this change will be proportional to the value of T. Thus, when T is a maximum, a given incremental change in light source intensity L, will produce a proportionately large change in the output current or meter reading I. However, for proper compensation, it is $\partial I$ which must be compensated by the current from adjustable resistance 24. Since $\partial I$ is a function not only of $\partial L$ but also of T, it is clear that the magnitude of the bucking current from adjustable resistance 24 must be varied not only in accordance with changes in the flux radiated by lamp 10, but also in accordance with the density of sample 13, which determines the value of T.

However, in logarithmically responsive photocell circuits, the change in output or meter current is independent of the density of sample 13. In the photometric circuit described in my copending application and illustrated in Figure 1 hereof, the following relationships apply: By definition, the density, D, of sample 13 is equal to the log of the reciprocal of the light transmission T, i. e., $$D = \log \text{ of } \frac{1}{T}$$

The output current is a function of the amount of flux incident on phototube 15. The flux incident upon phototube 15 is equal to the radiant flux originating from lamp 10 minus the light flux absorbed by sample 13. The following relationships then apply:

$$I \alpha \log F \tag{1}$$

where I is the amplifier tube plate current and F is the flux incident on the phototube; or $$I = C (\log F) \tag{2}$$

The flux F depends on the intensity of the light source (L) and the density (D) (or transmission (T) of the specimen) as follows:

$$F = L \cdot T \tag{3}$$

$$D = \log \frac{1}{T} = -\log T; \text{ or } \log T = -D$$

$T = \text{antilog } (-D)$
$F = L \cdot \text{antilog } (-D)$, from Equation 3
$I = C \log (L \cdot \text{antilog} - D)$, from Equation 2
$$\therefore I = C (\log L - bD) \tag{4}$$

The numerical value of the constant $b$ in the equation $I = C (\log L - bD)$ depends on the geometry of the optical system.

Equation 4 may be rewritten as follows:

$$I = C \log L - C \cdot b \cdot D$$

where

I is the output current
L is the intensity of the source
D is the optical density of the specimen, and
C and $b$ are constants Treating the density D as a constant, and solving for the partial derivative $$\frac{\partial I}{\partial L}$$

we obtain $$\frac{\partial I}{\partial L} = \frac{C}{L}$$

or $$\partial I = C \cdot \left(\frac{\partial L}{L}\right) \tag{5}$$

It will be noted that this last equation, which is an expression of plate current variation in terms of light source variation, is independent of the term D and thus of the density of sample 13. The output current I is thus dependent upon the flux originated by lamp 10, assuming sample 13 remains at any density level.

The intensity of the light source in the case of incandescent lamps operated under normal conditions is a definite function of the applied voltage. According to the relation $$L = \left(\frac{1}{V}\right)^m$$

where L represents the lamp intensity, V represents the voltage and $m$ is a constant. Over an appreciable voltage range the intensity may be regarded as a linear function of the applied voltage, and for lamps operating at color temperatures of the order of 2500 K. a change of voltage of 1% results in a change of lamp intensity of the order of 3 or 4%. Thus, Equation 5 may be rewritten in terms of variation in the supply voltage as $$\partial I = C' \cdot \left(\frac{\partial V}{V}\right) \tag{6}$$

where $$C = \frac{1}{3}$$

C' and V is the supply voltage.

In the case of gaseous discharge tube sources such as argon tubes or fluorescent lamps the relationship between the intensity of the lamp (tube and ballast) is usually directly proportional to the voltage applied to the source as a whole. In this case Equation 5 may be rewritten as $$\delta I = C'' \cdot \frac{\partial V}{V} \quad (7)$$

where $C'' = C$.

If the compensating current is so derived that it is linearly related to the main supply voltage which supplies the lamp voltage, virtually perfect stability of meter readings may be obtained. Thus, in logarithmic circuits, the compensating current which will perfectly compensate for variations in light source intensity is completely independent of the density of sample 13 and hence of the reading of meter 22.

Figure 2 illustrates an alternative embodiment of the invention. As the elements of Figure 2 are in large part the same as those in Figure 1, the same reference characters primed have been given to corresponding parts. In this circuit, as in Figure 1, the light from lamp 10' is directed through lens 11', filter 12' and sample 13' upon phototube 15'. The anode 16' of phototube 15' is again connected in series circuit relation with the grid 18' of amplifier tube 20'. The several voltages mentioned above are derived from potentiometer 25' having a gaseous regulating tube 40' connected thereacross, through interconnected taps 41' and 42'. However, in this instance, regulating tube 40' is connected across the entire potentiometer to regulate all of the voltages, including the compensating voltage introduced by adjustable resistor 24'.

For the purpose of fully compensating the meter reading for variations in the intensity of light source 10', a barrier layer photocell 45 is arranged in operative relation with a second incandescent lamp 50 connected, in parallel with lamp 10', to conductors 27'. This arrangement is illustrative only, and photocell 45 may be arranged in operative relationship with lamp 10' in cooperation with phototube 15'. The positive terminal 46 of photocell 45 is connected by a conductor 47 to adjustable tap 48' of resistance 24'. Tap 48' is connected to one terminal 51 of meter 22' which terminal is also connected to the plate of tube 20 through resistor 57'. The other terminal 52 of the meter is connected to tap 28' and also, through conductor 53, to the negative terminal 54 of photocell 45. The photocell 45 receives, from lamp 10' or lamp 50, the radiant flux unmodulated by passing through sample 13'. Thus, photocell 45 introduces into the output bucking circuit a current supplementing that derived through 24' but which varies in accordance with changes in the intensity of the light source and is independent of the density of the specimen 13'. By proper selection of the circuit constants and positioning of the photocell 45 with respect to the light source, an arrangement can be found which will satisfactorily compensate for variations in light source intensity. The arrangement illustrated in Figure 2 has an advantage over the arrangement illustrated in Figure 1 in that changes in the light source intensity due to any causes whatever are compensated, whereas, in the arrangement of Figure 1, only variations in the supply voltage common to both lamp 10 and the electronic circuit are compensated.

However, reference to the Equation 5 relating the output current of the logarithmic responsive circuit to the flux originated by the light source will show that the same change in the compensating current is required for a specific percentage change in the intensity of lamp 10 irrespective of the total level of the lamp intensity itself. In other words, a change in the lamp output of 0.10 to 0.11 lumen would require the same absolute change in output bucking current as a change from 10.0 to 11.0 lumens would require. With the circuit of Figure 2, the change in the barrier layer photocell current will not give the same absolute difference in current for given percentage changes in lamp intensity at low light intensities as at high levels. In most instances, however, the change in total lamp intensity is not great, so that compensation on the basis of a single magnitude of output flux of lamp 10' in the equation relating output current to incident flux will be satisfactory in actual practice.

An alternative arrangement for Figure 2, and one which will not be subject to the foregoing objection, is to substitute a logarithmic photoelectric tube responsive circuit for the circuit including barrier layer photocell 45. In such arrangement, a change in the ratio of $$\frac{\delta L}{L}$$

would produce the same change in bucking current regardless of the level of the lamp intensity. Thus, enormous drift, however slow or rapid, in the light source intensity, would be compensated automatically by this arrangement. However, to simplify the illustration in the drawings and because the substitution is believed apparent after full understanding of the other arrangements, this particular arrangement has not been shown in the drawing.

It is not necessary, from the standpoint of this invention, to incorporate elements 40', 41', 42' and 43' in the arrangement illustrated in Figure 2. Some simplification results when these elements are eliminated and the rate of change of compensating current is so adjusted that compensation exists not only for the change in lamp intensity but also those changes in I due to changes in the plate voltage, grid bias voltage (and amplifier tube filament voltage). In all cases wherein the barrier layer photocell is used for compensation, the rate of change of the compensating current can be adjusted to equal $\delta I$ in Equation 5 by adjustment of the absolute flux level incident on the photocell and connecting the potentiometer terminal of conductor 53 to some suitable point on the potentiometer 25'. In those cases where a large rate of change of compensating current is required, as in those cases wherein an incandescent lamp is used and element 40' is absent, photocell 45 will be located close to the lamp 10' and conductor 53 will be connected to potentiometer 25' at some point between 28' and 32'. In this manner, the absolute level of the bucking current is not changed, only the rate of change of bucking current is affected. The same effect can also be accomplished by proper adjustment of the bucking current through change in tap 48'. The closer to the light source the photocell is placed the less primary bucking current is required for optimum operation of the instrument.

The described arrangements provide for compensating the meter readings of logarithmic photo electric densitometers in such a manner that changes in the output flux of the light source will not affect the meter readings irrespective of the portion of the output meter scale in use. The arrangement is simple, inexpensive, and incorporated within the circuit, thus eliminating the necessity for external or added apparatus.

It is emphasized that this invention is intended for application to all photoelectric photometers comprising all types of light sources, all types of photosensitive elements and all types of logarithmic amplifiers rather than simply the illustrative cases shown.

While specific embodiments of the invention have been shown and described to illustrate the application of the principles thereof, it will be apparent that the invention may be otherwise embodied without departing from such principles.

What is claimed is:

1. A radiant energy measuring system comprising, in combination, a source of fluctuating potential; an electrically activated source of radiant energy electrically connected to said potential source for activation thereby; a radiant energy sensitive element arranged to receive energy from said energy source; an energy translating device having its input in circuit connection with the output of said element and having an energy output logarithmically related to the radiant energy incident upon said element from said energy source; and a compensating element in electric circuit relation with the output of said device and with said potential source and operatively responsive to the radiant energy output of said energy source to introduce, into the output of said device, an amount of energy of such polarity and magnitude as to compensate for fluctuations in the output of said energy sensitive element and said device resulting from variations in the radiant energy intensity of said energy source due to fluctuations of said potential source.

2. An electronic radiant energy measuring system comprising, in combination, a source of fluctuating potential; an electrically activated source of radiant energy electrically connected to said potential source for activation thereby; a radiant energy sensitive element arranged to receive energy from said energy source; an energy translating electronic device having its input in circuit connection with the output of said element and having an electrical output logarithmically related to the radiant energy incident upon said element from said energy source; and a compensating element in electric circuit relation with the output of said device and with said potential source and operatively responsive to the radiant energy output of said energy source to introduce, into the output circuit of said device, a bucking current of such polarity and magnitude as to compensate for fluctuations in the output of said energy sensitive element and said device resulting from variations in the radiant energy intensity of said energy source due to fluctuations of said potential source.

3. An electronic radiant energy measuring system comprising, in combination, a source of fluctuating potential; an electrically activated source of radiant energy electrically connected to said potential source for activation thereby; a radiant energy sensitive element arranged to receive energy from said energy source; an energy translating electronic device having its input in circuit connection with the output of said element and having an electrical output logarithmically related to the radiant energy incident upon said element from said energy source; voltage means in circuit connection with said device and said sensitive element for applying potentials thereto from said potential source; and a compensating element in electric circuit relation with the output of said device and with said voltage means and operatively responsive to the radiant energy output of said energy source to introduce, into the output circuit of said device, a bucking current of such polarity and magnitude as to compensate for fluctuations in the output of said energy sensitive element and said device resulting from variations in the radiant energy intensity of said energy source due to fluctuations of said potential source.

4. A light measuring system comprising, in combination, a source of fluctuating potential; an electrically activated source of light electrically connected to said potential source for activation thereby; a photosensitive element arranged to receive energy from said light source; an energy translating device having its input in circuit connection with the output of said element and having an energy output logarithmically related to the light incident upon said element from said light source; and a compensating element in electric circuit relation with the output of said device and with said potential source and operatively responsive to the light output of said light source to introduce, into the output of said device, an amount of energy of such polarity and magnitude as to compensate for fluctuations in the output of said photosensitive element and said device resulting from variations in the light intensity of said light source due to fluctuations of said potential source.

5. An electronic light measuring system comprising, in combination, a source of fluctuating potential; an electrically activated source of light electrically connected to said potential source for activation thereby; a photosensitive element arranged to receive energy from said light source; an energy translating electronic device having its input in circuit connection with the output of said element and having an electrical output logarithmically related to the light incident upon said element from said light source; and a compensating element in electric circuit relation with the output of said device and with said potential source and operatively responsive to the light output of said light source to introduce, into the output circuit of said device, a bucking current of such polarity and magnitude as to compensate for fluctuations in the output of said photosensitive element and said device resulting from variations in the light intensity of said light source due to fluctuations of said potential source.

6. An electronic light measuring system comprising, in combination, a source of fluctuating potential; an electrically activated source of light electrically connected to said potential source for activation thereby; a photosensitive element arranged to receive energy from said source; an energy translating electronic device having its input in circuit connection with the output of said element and having an electrical output logarithmically related to the light incident upon said element from said light source; voltage means in circuit connection with said device and said sensitive element for applying potentials thereto from said potential source; and a compensating element in electric circuit relation with the output of said device and with said voltage means and operatively responsive to the light output of said light source to introduce, into the output circuit of said device, a bucking current of such polarity and magnitude as to compensate for fluctuations in the output of said photosensitive element and said device resulting from variations in the light intensity of said light source due to fluctuations of said potential source.

7. An electronic density measuring system comprising, in combination, a source of fluctuating electrical potential; an electrical light source in circuit connection therewith; a photosensitive element arranged to receive light from said light source, said element having an electrical conductivity depending upon the amount of light reaching said element from said light source; an electronic device having its input in circuit connection with the output of said element and having an electrical output logarithmically related to the conductivity of said element; voltage means in circuit connection with said device and said sensitive element for applying potentials thereto from said potential source; electronic voltage stabilizing means in electric circuit relation with said voltage means; and a compensating element in electric circuit relation with the output of said device and with said voltage means and operatively responsive to the light output of said light source to introduce, into the output circuit of said device, a bucking current of such polarity and magnitude as to compensate for fluctuations in the output of said photosensitive element and said device resulting from variations in the light intensity of said light source due to fluctuations of said potential source.

8. An electronic density measuring system comprising, in combination, a source of fluctuating electrical potential; an electrical light source in circuit connection therewith; a photosensitive element arranged to receive light from said light source, said element having an electrical conductivity depending upon the amount of light reaching said element from said light source; an electronic device having its input in circuit connection with the output of said element and having an electrical output logarithmically related to the conductivity of said element; voltage means in circuit connection with said device and said sensitive element for applying potentials thereto from said potential source; electronic voltage stabilizing means in electric circuit relation with said voltage means; and a compensating impedance network in electric circuit relation with the output of said device and with said voltage means and operatively responsive in proportion to the light output of said light source to introduce, into the output circuit of said device, a compensating current of such polarity and magnitude as to compensate for fluctuations in the output of said photosensitive element and said device resulting from variations in the light intensity of said light source due to fluctuations of said potential source.

9. An electronic density measuring system comprising, in combination, a source of fluctuating electrical potential; an electrical light source in electric circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; and a compensating element in electric circuit relation with the output of said electronic amplifier means and with said potential source and operatively responsive in proportion to the light intensity of said light source to introduce, into the output circuit of said amplifier means, a compensating current of such polarity and magnitude as to compensate for fluctuations in the output of said phototube and amplifier means resulting from variations in the light intensity of said light source due to fluctuations of said potential source.

10. An electronic density measuring system comprising, in combination, a source of fluctuating electrical potential; an electrical light source in circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; and compensating means in electric circuit relation with the output of said electronic amplifier means and with said potential source and operatively responsive to the light intensity of said light source to introduce, into the output circuit of said amplifier means, a compensating current of such polarity and magnitude as to compensate for fluctuations in the output of said phototube and said amplifier means resulting from variations in the light intensity of said light source due to fluctuations of said potential source.

11. An electronic density measuring system comprising, in combination, a source of fluctuating electrical potential; an electrical light source in circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; voltage means in circuit connection with said phototube and said amplifier means for applying potentials thereto from said potential source; electronic voltage stabilizing means in electric circuit relation with said voltage means; and a compensating impedance network in electric circuit relation with the output of said electronic amplifier means and with said voltage means and operatively responsive in proportion to the light intensity of said light source to introduce, into the output circuit of said amplifier means, a bucking current of such polarity and magnitude as to compensate for fluctuations in the output of said phototube and said amplifier means resulting from variations in the light intensity of said light source due to fluctuations of said potential source.

12. An electronic density measuring system comprising, in combination, a source of fluctuation electrical potential; an electrical light source in circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; a voltage divider connected across said potential source; circuit means for applying operating potentials from a portion of said divider to said phototube and to said amplifier means; means for stabilizing such operating potentials comprising an electronic voltage regulating tube having its terminals connected a fixed ohmic distance apart along said voltage divider, said terminals connecting said regulator tube in parallel with at least said portion of said divider; and a compensating impedance network in electric circuit relation with the output of said electronic amplifier means and with said voltage divider and operatively linearly related in output to the light intensity of said light source to introduce, into the output circuit of said amplifier means, a bucking current of such polarity and magnitude as to compensate for fluctuations in the output of said phototube and said amplifier means resulting from variations in the light intensity of said light source due to fluctuations of said potential source.

13. An electronic density measuring system comprising, in combination, a source of fluctuating electrical potential; an electrical light source in circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; a voltage divider connected across said potential source; circuit means for applying operating potentials from a portion of said divider to said phototube and to said amplifier means; means for stabilizing such operating potentials comprising an electronic voltage regulating tube having its terminals connected a fixed ohmic distance apart along said voltage divider, said terminals connecting said regulator tube in parallel with at least said portion of said divider, and a compensating impedance network connected between the output of said electronic amplifier means and said voltage divider and operatively responsive in linear relation to the light intensity of said light source to introduce, into the output circuit of said amplifier means, a compensating current of such polarity and magnitude as to compensate for fluctuations in the output of said phototube and said amplifier means resulting from variations in the light intensity of said light source due to fluctuations of said potential source.

14. An electronic density measuring system comprising, in combination, a source of fluctuating electrical potential; an electrical light source in circuit connection therewith; a photoemissive vacuum phototube arranged to receive light from said light source, said phototube having an electrical conductivity depending upon the amount of light reaching said phototube from said light source; electronic amplifier means having an input electrically connected to the output of said phototube and having an electrical output logarithmically related to the conductivity of said phototube; a voltage divider connected across said potential source; circuit means for applying operating potentials from a portion of said divider to said phototube and to said amplifier means; means for stabilizing such operating potentials comprising an electronic voltage regulating tube having its terminals connected a fixed ohmic distance apart along said voltage divider, said terminals connecting said regulator tube in parallel with at least said portion of said divider; and a compensating impedance network connected between the output of said electronic amplifier means and another portion of said voltage divider and operatively responsive in linear relation to the light intensity of said light source to introduce, into the output circuit of said amplifier means, a bucking current of such polarity and magnitude as to compensate for fluctuations in the output of said phototube and said amplifier means resulting from variations in the light intensity of said light source due to fluctuations of said potential source.

15. An electronic light transmission and/or reflection measuring system comprising, in combination, a non-regulated source of electrical potential; a lamp connected to said source; a photoemissive vacuum phototube arranged to receive light from said lamp, said vacuum phototube having an electrical conductivity depending upon the amount of light reaching said vacuum phototube from said lamp; an electronic amplifier tube having parameters such that the grid potential thereof is a logarithmic function of its grid current; a conductor connecting the anode of said phototube to the grid of said amplifier tube, such that the grid current of said amplifier tube varies directly as the amount of light reaching said phototube; a voltage divider connected across said potential source; circuit means for applying operating potentials from a portion of said divider to said phototube and said amplifier tube; an impedance connected between said portion of said divider and the grid circuit of said amplifier tube for introducing a current into said grid circuit in opposition to the anode current of said phototube; means for stabilizing such operating potentials irrespective of fluctuations in the potential of said source comprising an electronic voltage regulating tube having its terminals connected a fixed ohmic distance apart along said voltage divider, said terminals connecting said regulator tube in parallel with said portion of said divider; and an impedance connected between the output of said amplifier tube and another portion of said voltage divider for introducing a bucking current into the output of said amplifier tube in opposition to the output current of said amplifier tube.

16. An electronic light transmission measuring system comprising, in combination, a non-regulated source of electrical potential; a lamp connected to said source; a photoemissive vacuum phototube arranged to receive light from said lamp, said vacuum phototube having an electrical conductivity depending upon the amount of light reaching said vacuum phototube from said lamp; an electronic amplifier tube having parameters such that the grid potential thereof is a logarithmic function of its grid current; a conductor connecting the anode of said phototube to the grid of said amplifier tube, such that the grid current of said amplifier tube varies directly as the amount of light reaching said phototube; a voltage divider connected across said potential source; circuit means for applying operating potentials from a portion of said divider to said phototube and said amplifier tube; a fixed resistor connected between said portion of said divider and the grid circuit of said amplifier tube for introducing a current into said grid circuit in opposition to the anode current of said phototube; means for stabilizing such operating potentials irrespective of fluctuations in the potential of said source comprising an electronic voltage regulating tube having its terminals connected a fixed ohmic distance apart along said voltage divider, said terminals connecting said regulator tube in parallel with said portion of said divider; and a variable resistance connected between the output of said amplifier tube and another portion of said voltage divider for introducing a bucking current into the output of said amplifier tube in opposition to the output current of said amplifier tube.

17. An electronic density measuring system comprising, in combination, a source of fluctuating potential; an electrically activated source of light electrically connected to said potential source for activation thereby; a photoemissive vacuum phototube arranged to receive light from said light source, said phototube having an electrical conductivity depending upon the amount of light reaching said phototube from said light source through the sample; electronic amplifier means having an input electrically connected to the output of said phototube and having an electrical output logarithmically related to the conductivity of said phototube; and compensating means in electric circuit relation with the output of said electronic amplifier means and operatively responsive to the light intensity of said light source to introduce, into the output circuit of said amplifier means, a bucking current of such polarity and magnitude as to compensate for fluctuations in the output of said phototube and amplifier means resulting from variations in the light intensity of said light source due to fluctuations of said potential source, said compensating means including an impedance in electric circuit relation with said amplifier means, light responsive electrical means arranged to receive light from said light source and circuit means connecting said electrical means to said impedance.

18. An electronic light transmission measuring system comprising, in combination, a non-regulated source of electrical potential for the whole system; lamp means connected to said source; a photoemissive vacuum phototube arranged to receive light from said lamp means, said vacuum phototube having an electrical conductivity depending upon the amount of light reaching said vacuum phototube from said lamp means; an electronic amplifier tube having parameters such that the grid potential thereof is a logarithmic function of its grid current; a conductor connecting the anode of said phototube to the grid of said amplifier tube, such that the grid current of said amplifier tube varies directly as the amount of light reaching said phototube; a voltage divider connected across said potential source; an impedance connected between the output of said amplifier tube and said voltage divider for introducing a bucking current into the output of said amplifier tube in opposition to the output current of said amplifier tube; an impedance means for introducing a bucking current into the grid circuit of said amplifier tube in opposition to the output current of said phototube; a barrier layer photocell arranged to receive light from said lamp means and having a current output depending upon the light incident upon said photocell from said lamp means; said photocell being connected in parallel circuit relation with the output of said amplifier tube, whereby said photocell will vary the effective value of the bucking current to compensate for changes in the intensity of said lamp means due to fluctuations in the potential of said source.

19. An electronic light transmission measuring system comprising, in combination, a non-regulated source of electrical potential; lamp means connected to said source; a photoemissive vacuum phototobe arranged to receive light from said lamp means, said vacuum phototube having an electrical conductivity depending upon the amount of light reaching said vacuum phototube from said lamp means; an electronic amplifier tube having parameters such that the grid potential thereof is a logarithmic function of its grid current; a conductor connecting the anode of said phototube to the grid of said amplifier tube, such that the grid current of said amplifier tube varies directly as the amount of light reaching said phototube; a voltage divider connected across said potential source; a variable resistance connected between the output of said amplifier tube and said voltage divider for introducing a bucking current into the output of said amplifier tube in opposition to the output current of said amplifier tube; a fixed resistor connected between said divider and the grid circuit of said amplifier tube for introducing a current into said grid circuit in opposition to the output current of said amplifier tube; a fixed resistor connected between said divider and the grid circuit of said amplifier tube for introducing a current into said grid circuit in opposition to the anode current of said phototube; a barrier layer photocell arranged to receive light from said lamp means and having a current output depending upon the light incident upon said photocell from said lamp means; said photocell being connected in parallel circuit relation with the output of said amplifier tube, whereby said photocell will vary the effective value of the bucking current to compensate for changes in the intensity of said lamp means due to fluctuations in the potential of said source; and an electronic voltage regulating tube connected across said voltage divider to maintain constant the potential thereof irrespective of fluctuations in the potential of said source.

MONROE HAMILTON SWEET.

REFERENCES CITED

The following references are of record in the file of this patent:

UNITED STATES PATENTS

| Number | Name | Date |
| --- | --- | --- |
| 2,245,124 | Bonn | June 10, 1941 |
| 2,219,928 | Kalmus | Oct. 29, 1940 |
| 2,326,878 | Muller | Aug. 17, 1943 |

FOREIGN PATENTS

| Number | Country | Date |
| --- | --- | --- |
| 367,591 | British | Feb. 25, 1932 |

OTHER REFERENCES

"A Precision Direct-Reading Densitometer," an article by M. H. Sweet in Journal of the Society of Motion Picture Engineers for February 1942; pp. 148 to 172 cited; pp. 153 to 160 especially relied upon.